Figure 1:
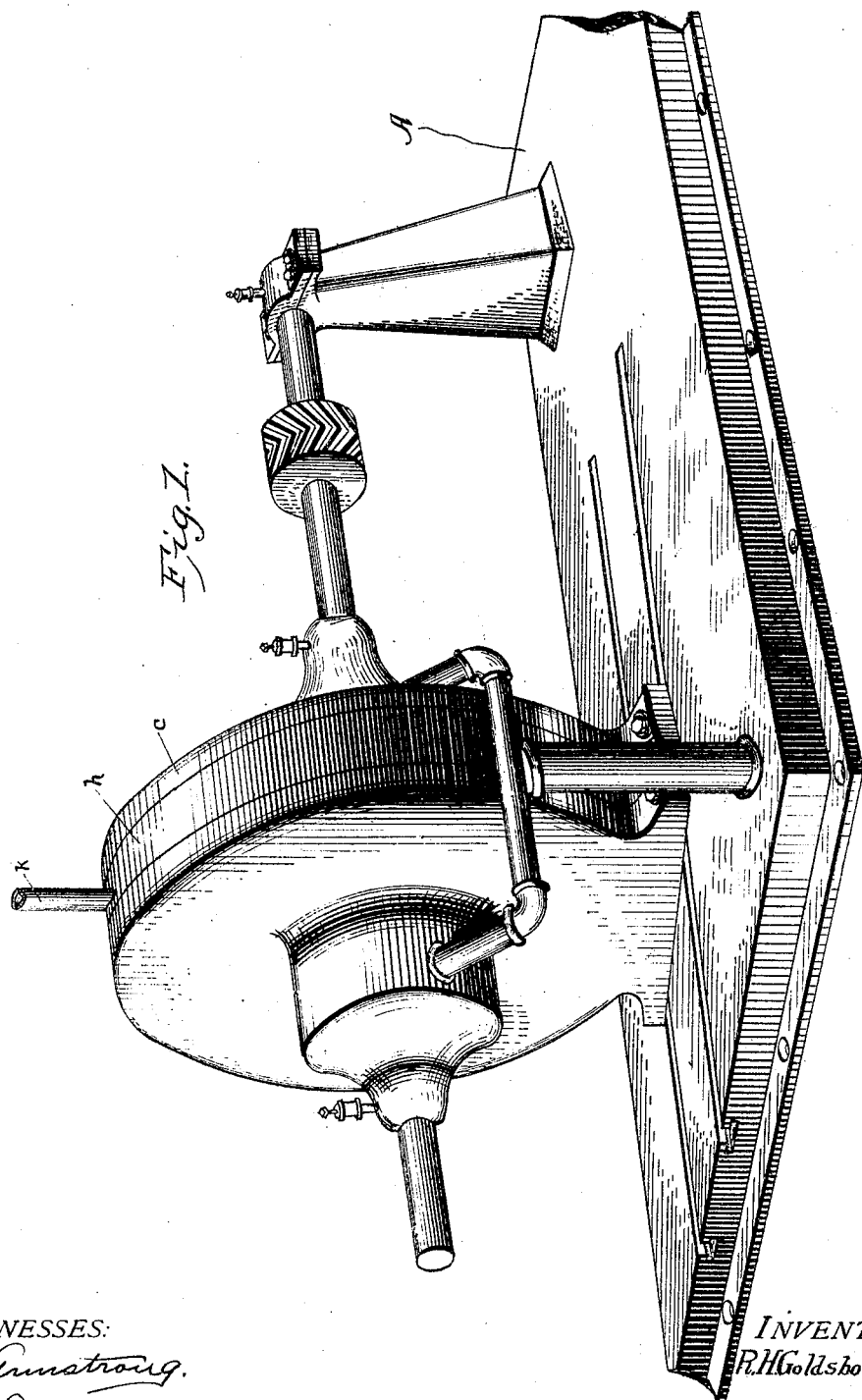

No. 794,606. PATENTED JULY 11, 1905.
R. H. GOLDSBOROUGH.
TURBINE.
APPLICATION FILED NOV. 13, 1903.

8 SHEETS—SHEET 1.

Fig. I.

WITNESSES:
L. Armstrong.
G. Ayres.

INVENTOR
R. H. Goldsborough,
BY G. Ayres
Attorney

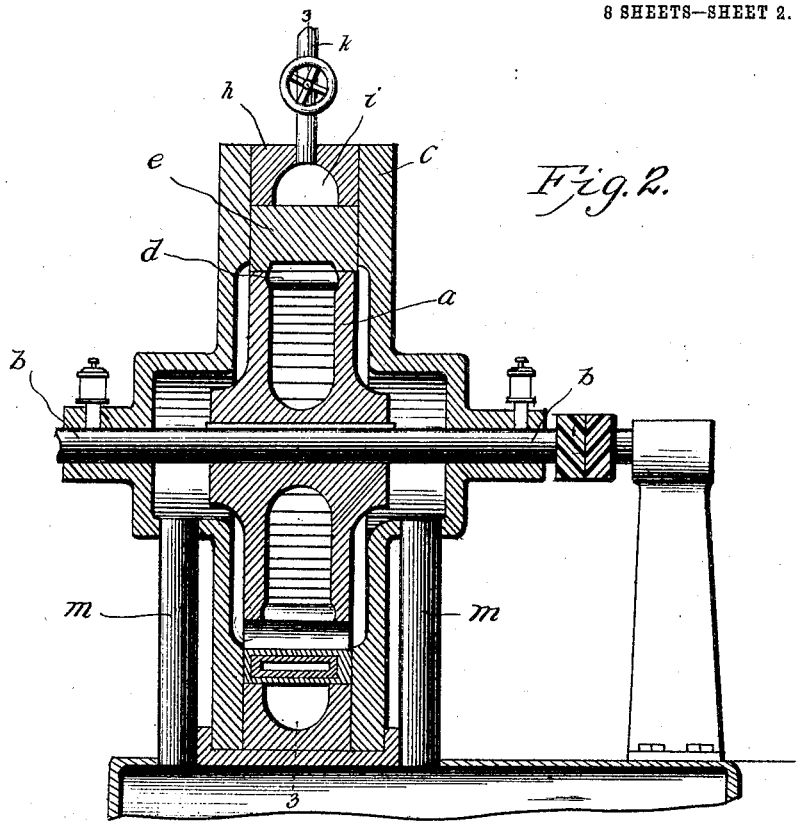
Fig. 2.
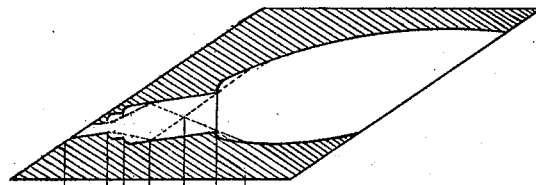
Fig. 7.
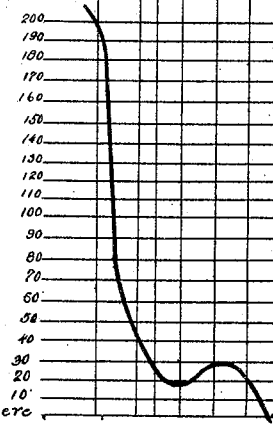

No. 794,606. PATENTED JULY 11, 1905.
R. H. GOLDSBOROUGH.
TURBINE.
APPLICATION FILED NOV. 13, 1903.

3 SHEETS—SHEET 3.

Inventor
R. H. Goldsborough,

Witnesses
L. Armstrong.
G. Ayres.

By G. Ayres
Attorney

No. 794,606. PATENTED JULY 11, 1905.
R. H. GOLDSBOROUGH.
TURBINE.
APPLICATION FILED NOV. 13, 1903.

8 SHEETS—SHEET 4.

Witnesses
L. Armstrong.
G. Ayrso.

Inventor
R. H. Goldsborough,

G. Ayrs.

Attorney

No. 794,606. PATENTED JULY 11, 1905.
R. H. GOLDSBOROUGH.
TURBINE.
APPLICATION FILED NOV. 13, 1903.
8 SHEETS—SHEET 5.
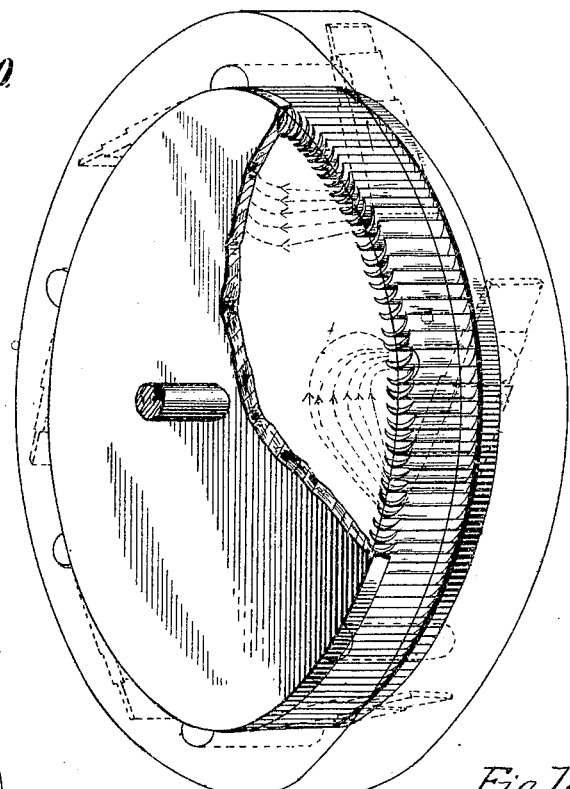
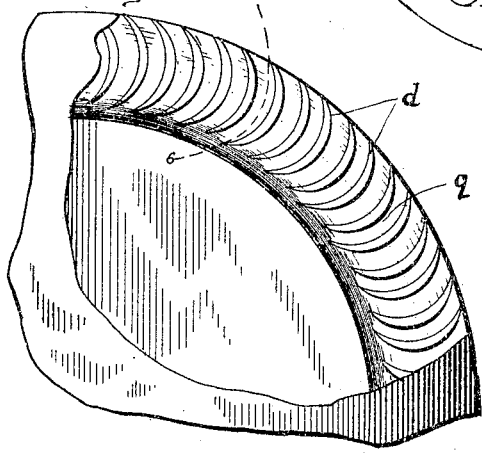
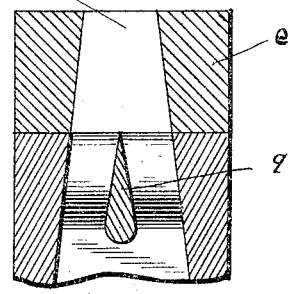
WITNESSES:
INVENTOR
R. H. Goldsborough,
BY
Attorney No. 794,606. PATENTED JULY 11, 1905.
R. H. GOLDSBOROUGH.
TURBINE.
APPLICATION FILED NOV. 13, 1903.

8 SHEETS—SHEET 6.

WITNESSES:
L. Armstrong.
G. Ayres.

INVENTOR
R.H. Goldsborough,
BY G. Ayres
Attorney

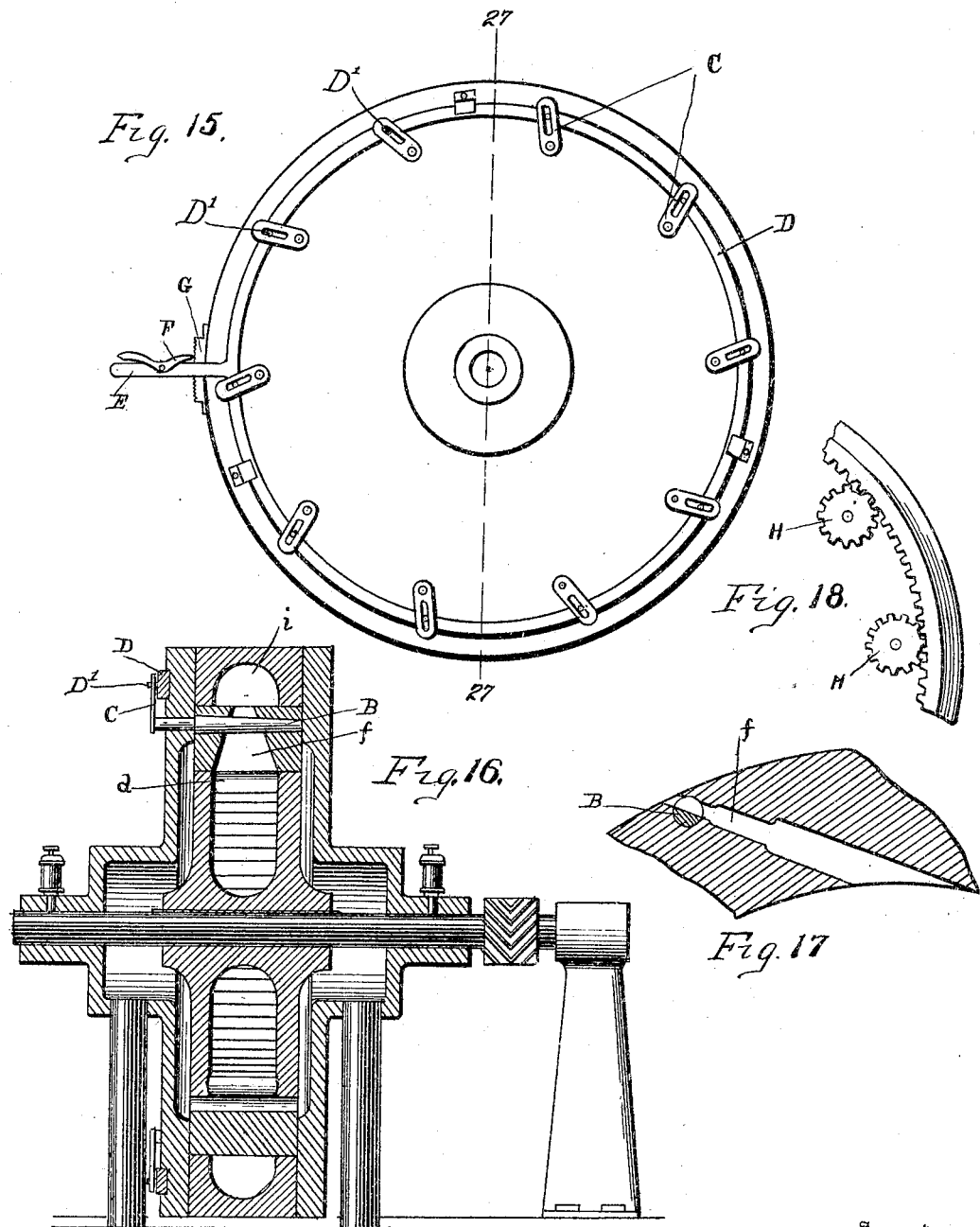

No. 794,606. PATENTED JULY 11, 1905.
R. H. GOLDSBOROUGH.
TURBINE.
APPLICATION FILED NOV. 13, 1903.
8 SHEETS—SHEET 8.
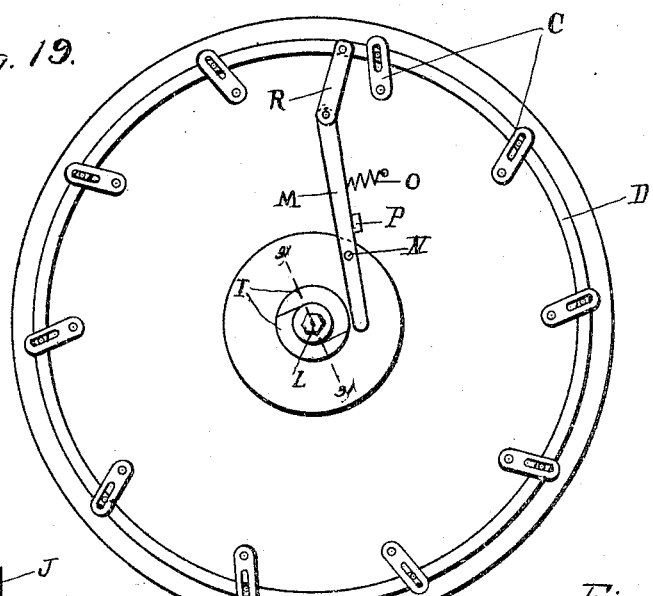
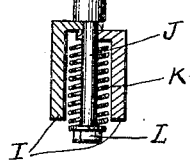
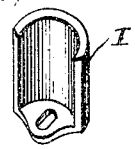
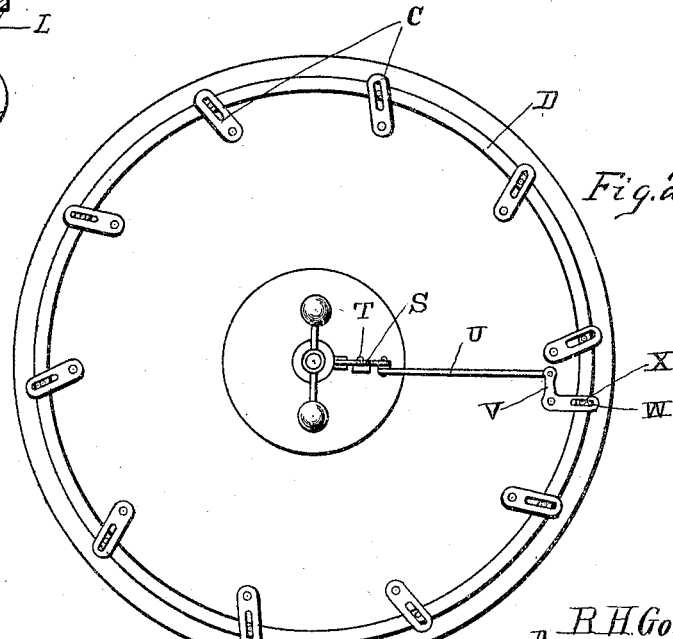
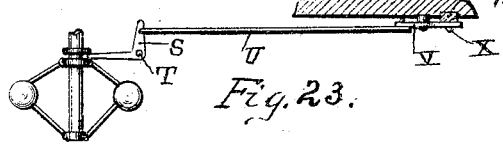

No. 794,606.

Patented July 11, 1905.

UNITED STATES PATENT OFFICE.

RICHARD H. GOLDSBOROUGH, OF WASHINGTON, DISTRICT OF COLUMBIA.

TURBINE.

SPECIFICATION forming part of Letters Patent No. 794,606, dated July 11, 1905.

Application filed November 13, 1903. Serial No. 181,060.

*To all whom it may concern:*

Be it known that I, RICHARD H. GOLDSBOROUGH, a citizen of the United States, residing at Washington, in the District of Columbia, have invented new and useful Improvements in Turbines, of which the following is a specification.

My invention relates to turbine-motors; and it consists in the constructions, combinations, and arrangements herein described and claimed.

The objects of my invention are to provide a construction in which the expansion of the steam during the conversion of its heat energy into kinetic energy is unaccompanied by the usual losses caused by skin and fluid friction and by oscillations of pressure due to conflicting currents. Heat is imparted to the steam during its expansion, thus materially increasing its velocity of flow and kinetic energy and also preventing the condensation incident to adiabatic expansion. The steam flowing from the diverging ports or nozzles is delivered equally across the entire lengths of the several vanes subtended by the nozzles, in which all lateral thrust on the shaft is avoided, thereby obviating wear and incident loss of power, and which is capable of being quickly brought up to speed.

A further object of my invention is to provide a construction in which the energy of the motive fluid will be utilized in a highly-efficient manner.

While my invention is especially designed for use with steam as a motive fluid, it is adapted to employ gas or other elastic fluid as the actuating medium.

Figure 3:
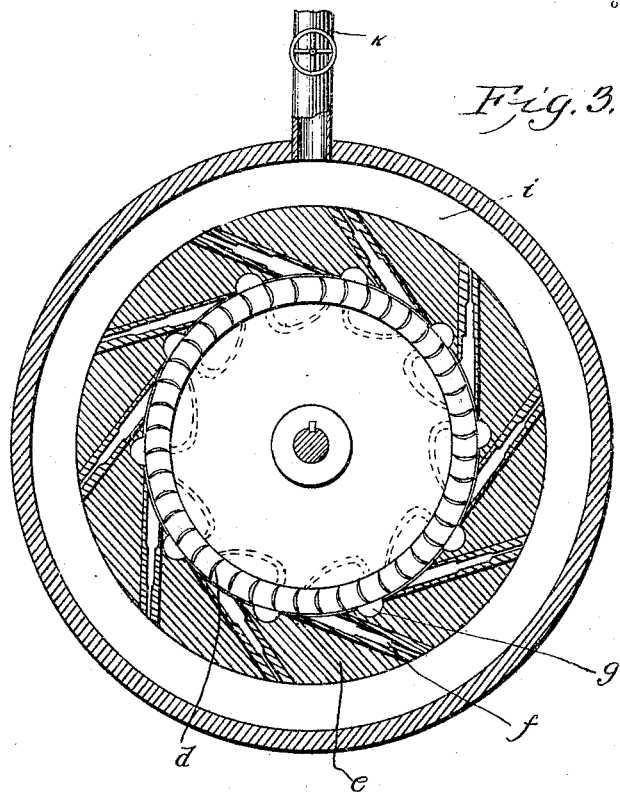
Figure 4:
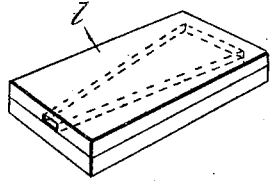
Figure 5:
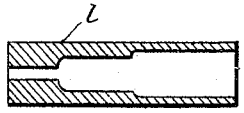
Figure 6:
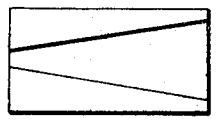
Figure 8:
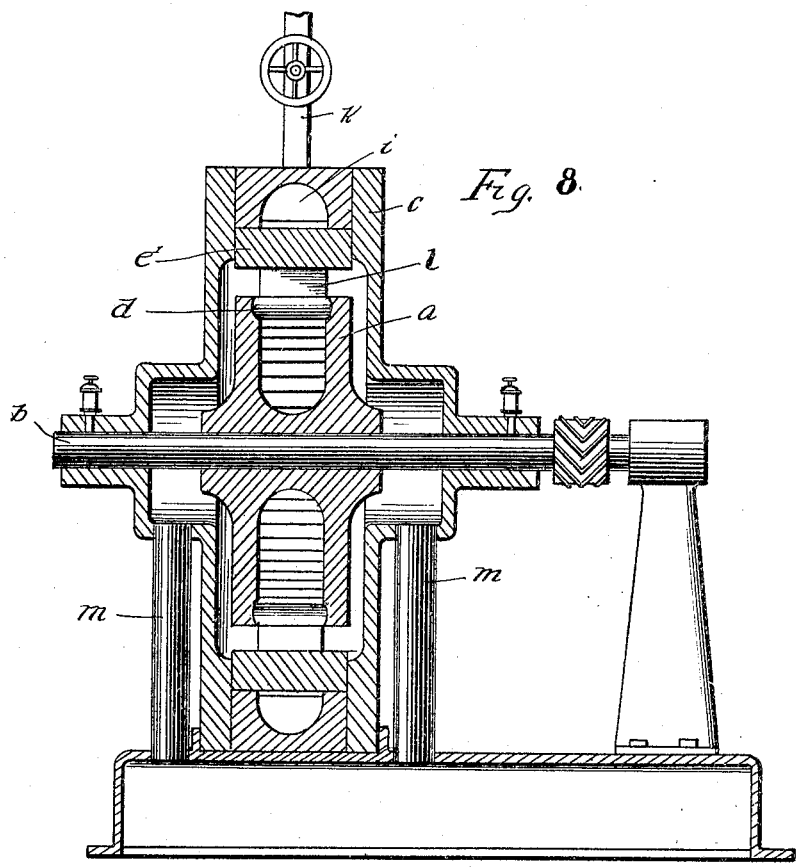
Figure 9:
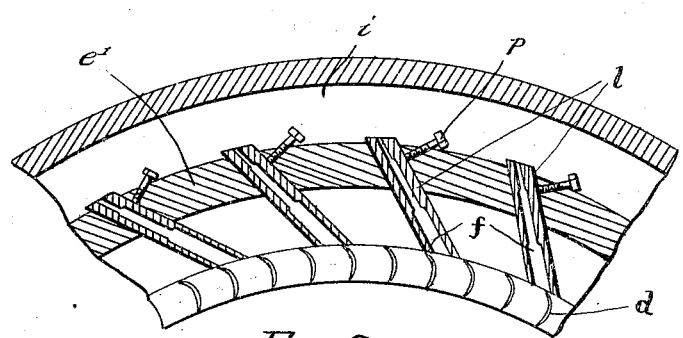
Figure 13:
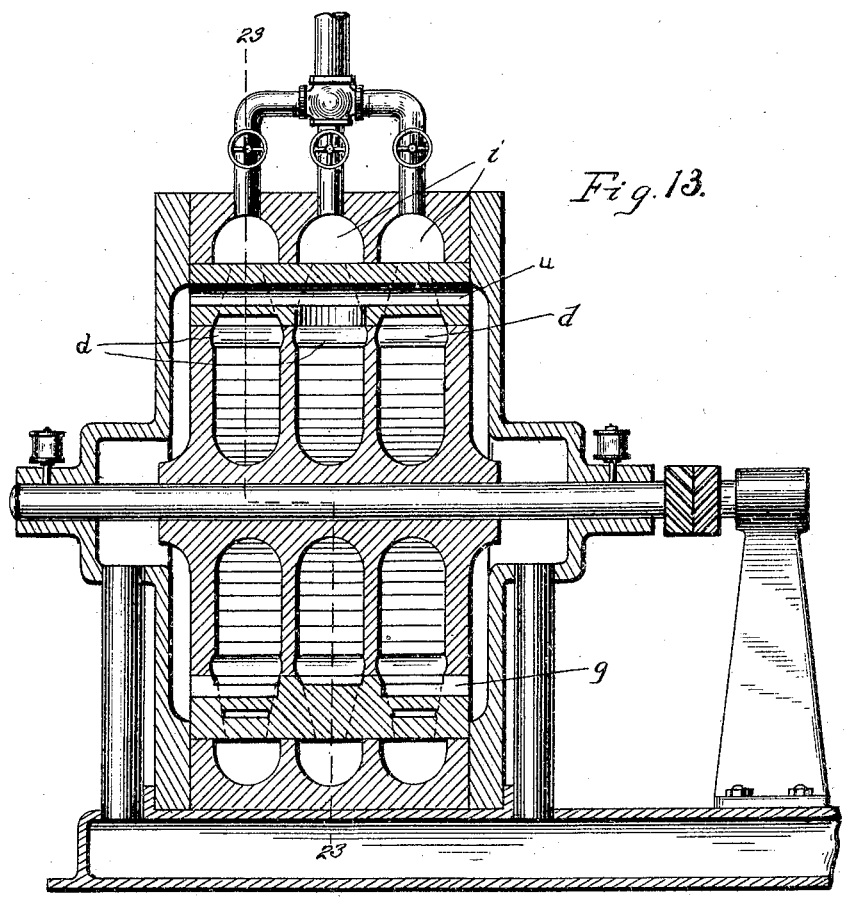
Figure 14:
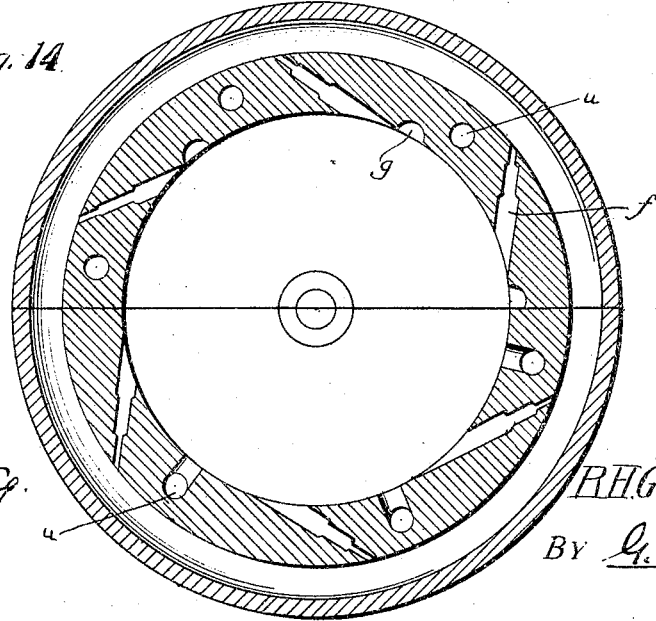

Referring to the accompanying drawings, forming a part of this application, and in which similar reference-symbols indicate corresponding parts in the several views, Figure 1 is a perspective view showing the general arrangement of one embodiment of my invention. Fig. 2 is an axial vertical section illustrating a form of my invention. Fig. 3 is a sectional view on the line 3 3 of Fig. 2. Figs. 4, 5, and 6 are detail views, on a larger scale, of my preferred form of steam-port. Fig. 7 is a diagrammatical view illustrating the general contour and proportions of the steam-port. Fig. 8 is an axial vertical section of a further modified construction. Fig. 9 is a detail sectional view, on a larger scale, showing the arrangement of the steam-ports in the construction of Fig. 8. Fig. 10 is a perspective view showing the path taken by the steam in the construction illustrated in Figs. 1 and 3. Fig. 11 is a detail view showing a construction in which the rotating vanes are provided with a central strengthening and deflecting portion. Fig. 12 is a sectional elevation on line 16 16 of Fig. 11. Fig. 13 is an axial vertical section illustrating a construction in which three turbine-wheels of the type illustrated in Figs. 2 and 3 are mounted within a single casing. Fig. 14 is a sectional view on the line 23 23 of Fig. 13. Fig. 15 is an end elevation of a turbine-casing, showing means for throttling the several steam-ports. Fig. 16 is a sectional elevation on the line 27 27 of Fig. 15. Fig. 17 is a detail sectional view showing one of the steam-ports and its throttling-valve. Fig. 18 is a detail view showing pinions employed in place of the slotted links of the construction illustrated in Fig. 15. Fig. 19 is an end elevation of a turbine-casing, showing automatic governing means arranged to control the throttling-valves. Fig. 20 is a sectional elevation of the governor device on the line 31 31 of Fig. 19. Fig. 21 is a perspective view showing one of the semicylinders of the governor device. Fig. 22 is an end view of a turbine-casing, illustrating another governing means for automatically actuating the throttling-valve; and Fig. 23 is a detail view, showing the arrangement of the governing means and its attachments.

Referring especially to Figs. 2 and 3 of the drawings, $a$ indicates a turbine-wheel journaled at $b$ $b$ in a casing $c$. The wheel may be formed of one integral part, as shown, or of separate parts secured together to facilitate clamping the vanes in position. $d$ indicates an annular series of vanes carried by the turbine-wheel and preferably arranged with their outer edges lying in the periphery of said wheel. A ring or annular member $e$ is provided with a plurality of steam-ports $f$ and with exhaust-ports $g$, arranged intermediate thereof. An outer ring $h$ is provided with a steam-chamber $i$, in which the steam is maintained at any desired pressure, steam being admitted through a pipe $k$. It will be understood that the annular member is maintained at a high temperature by the steam in the surrounding chamber $i$ and that heat is imparted from the relatively hot walls of the diverging ports to the steam flowing therethrough. It is very advantageous to thus heat the steam during its expansion, as it greatly augments the velocity and kinetic energy of the flowing steam and further prevents the condensation incident to adiabatic expansion. In the preferred construction (illustrated in Figs. 2 and 3) the temperature of the walls of the several ports is maintained highest adjacent their entrance-orifices and decreases toward their discharge-orifices, thus supplying the greatest amount of heat to the steam flowing through the port at the point of its greatest expansion and imparting heat throughout the length of the port apportionate in amount to the temperature and rate of expansion of the steam flowing therethrough. Obviously the annular member $e$ can be chambered to maintain the temperature approximately uniform throughout the entire length of each port $f$, if desired. The steam-ports may be formed in removable boxes or cartridges $l$, as clearly illustrated in Figs. 3, 4, 5, and 6, and the exhaust-ports may constitute grooves extending entirely across the inner periphery of the annular member $e$. The steam-ports $f$ are shown diverging to permit transformation of the heat energy of the steam into kinetic energy during the expansion of the steam while flowing through such ports.

Fig. 7 illustrates a preferred form of diverging steam-port in which the increase in cross-section is obtained by abrupt changes or steps. In this figure the broken lines indicate the direction taken by steam flowing through the port, while the tabulated line indicates the steam-pressure at different points in its flow. This construction is especially advantageous, in that it obviates the excessive skin friction existing in the usual type of uniformly-diverging steam-nozzles and also avoids the disadvantageous oscillations of steam-pressure occurring in ports formed with a small inlet-orifice and larger main portion of uniform area. In this preferred construction the steam is rapidly expanded in the stepped portion of the port in a most efficient manner and advantageously directed in the curved portion of the port, with a minimum loss through friction and conflicting currents.

In the operation of my invention steam is supplied to the annular chamber $i$ through the supply-pipe $k$, the pressure in said annular chamber being maintained at any desired point. From the chamber $i$ the steam expands in passing through the diverging ports $f$ and strikes the vanes $d$ with high velocity. The vanes $d$ are preferably so shaped as to cause a practical reversal in the direction of flow of the impacting steam, as indicated by broken lines in Figs. 3 and 14. The steam upon leaving the vanes is deflected past the adjacent exhaust-port, which latter is constantly in free communication with the atmosphere or with a condenser through the pipes $m$. If desired, the wheel-casing $c$ may be constructed to constitute a condenser by the addition of cold-water pipes or water-sprays, thereby maintaining a rarefied medium about the rotating wheel. The steam deflected from the vanes in seeking the path of least pressure will recurve and escape through the vanes into the exhaust-port, thus furnishing an additional power to rotate the turbine-wheel. Under certain conditions a portion of the expansion of the steam can be advantageously utilized prior to its first impact on the vanes and the expansion then completed during the flow of the steam from the interior of the wheel to the exhaust-ports.

Figs. 8 and 9 illustrate a construction in which an annular member $e'$ is spaced from the periphery of the turbine-wheel and acts as a support for the boxes $l$, containing the steam-ports $f$, fastening devices, such as screws $p$, being provided for securely maintaining the boxes in properly-adjusted position. In this construction the steam passes inwardly through the vanes and then returns therethrough to the space about their outer periphery, from which it escapes through the pipes $m$, as shown in the construction of Figs. 2 and 3.

Figs. 11 and 12 illustrate a construction in which an annular stiffening member $q$ is shaped to closely fit the vanes. This member $q$ thus acts to resist centrifugal action, to prevent bending of the vanes, and also to constitute a guide for the steam flowing between the vanes.

Figs. 13 and 14 illustrate a construction in which three turbine-wheels similar to that illustrated in Figs. 2 and 3 are mounted within a single casing. In this construction the steam from the chambers $i$ $i$ $i$ is directed by the ports $f$ against the vanes $d$. The steam then repasses through the vanes and escapes through the exhaust-ports $g$ from the two outside wheels and through the exhaust-ports $u$ from the inner wheel.

Figs. 15, 16, and 17 illustrate means for manually controlling the steam-ports. In this construction each inlet-port is provided with any suitable valve B, which extends through the casing and carries a slotted link C at its outer end. A ring D is rotatably seated in the casing, as clearly shown in Fig. 16, and is provided with a handle E, carrying a latch F, which latter is constructed to engage a toothed segment G for securing the ring in its adjusted positions. The ring D is shown provided with a plurality of detachable pins D', fitting within the slotted links C, whereby rotation of the ring D will uniformly actuate the several valves to vary the size of the inlet-ports. Any number of the inlet-ports can be shut off, if desired, by removing their actuating-pins D' and properly adjusting their slotted links C.

Fig. 18 is a detail view showing a similar construction, in which a ring D is toothed and engages pinions H, secured to the several valves.

Fig. 19 shows automatic governing means for shifting the ring D. The governor consists of two segmental-shaped portions 1, each provided with a slotted base engaging the reduced portion J of the main turbine-shaft. A spring K bears against the bases of the segmental portions and tends to maintain the latter in their normal position close to the shaft. The bearing-nut L confines the outer end of the said spring and provides means whereby its tension may be regulated. A lever M, pivoted at N to any convenient portion of the turbine-casing, is normally held by a spring O against a stop P, with its inner end somewhat removed from the governor device in its closed position. A link R, connecting the outer end of the lever with the ring D, provides means whereby the ring will be actuated upon movement of the lever about its pivotal point N. As shown in Fig. 19, the inlet-valves are fully opened, with the governor in its normal closed position out of contact with the lever M. Should the turbine speed rise above that at which the governor is set, the segmental portions I will be swung out under the action of centrifugal force sufficiently to engage the inner end of the lever M, and thereby rock the lever to actuate the ring D and partially close the steam-ports. This construction provides a simple and reliable means for maintaining a constant speed of the turbine under a varying load.

Figs. 22 and 23 show any usual type of ball-governor employed for actuating a ring D. In this construction a bell-crank S, pivoted at T to the turbine-casing, is connected by a link U to a second bell-crank lever V, which latter is provided with a slot W, engaging a pin X, carried by the ring D. Should the speed of the turbine exceed that to which the governor has been adjusted, the governor-balls, flying out under centrifugal action, will rock the bell-crank lever S and, through the link U, rock the second lever V, thereby actuating the ring D and regulating the steam-ports.

It is obvious that the above construction can be readily adapted for the employment of any other old form or type of governing devices.

By thus throttle-controlling the entrance of each steam-port the initial pressure in the chamber $i$, from which the steam expands while acquiring energy during its flow through the diverging ports, can be maintained constant, thereby providing a construction greatly superior to those commonly employed in which the governor operates to throttle the steam-supply pipe and produce large variation in the steam-pressure at the entrance of the ports.

Having thus described my invention, what I claim as new, and desire to secure by Letters Patent, is—

1. In a turbine, the combination of a rotor provided with an annular chamber, an annular series of vanes carried by said rotor and circumscribing said annular chamber, a set of admission-ports arranged about the outer periphery of said annular series of vanes, and means positioned between the several admission-ports of said set for receiving an actuating medium discharged outwardly through said vanes, substantially as described.

2. In a turbine, the combination of a rotor, provided with an annular chamber, an annular series of vanes carried by said rotor and circumscribing said annular chamber, a set of admission-ports arranged about the outer periphery of said annular series of vanes, and exhaust-ports positioned between the several admission-ports of said set, substantially as described.

3. In a turbine, the combination of a rotor provided with an annular chamber, an annular series of vanes carried by said rotor and circumscribing said annular chamber, and a plurality of admission and exhaust ports alternately positioned about the outer periphery of said annular series of vanes, substantially as described.

4. In a turbine, the combination of a rotor provided with an annular chamber, an annular series of vanes carried by said rotor and circumscribing said annular chamber, and a plurality of pairs of admission and exhaust ports arranged uniformly about the outer periphery of said annular series of vanes, substantially as described.

5. In a turbine, the combination of a rotor provided with an annular chamber, an annular series of vanes carried by said rotor and circumscribing said annular chamber, and two equal sets of admission and exhaust ports positioned about the outer periphery of said annular series of vanes, said exhaust-ports being arranged alternately with said admission-ports, substantially as described.

6. In a turbine, the combination of a casing, a rotor journaled therein and provided with an annular chamber, an annular series of vanes carried by said rotor and circumscribing said annular chamber, a set of admission-ports arranged about the outer periphery of said annular series of vanes, and exhaust-ports extending across the periphery of said annular series of vanes between the several admission-ports of said sets, said exhaust-ports constructed to discharge the exhaust laterally in both directions into said casing, substantially as described.

7. In a turbine, the combination of a rotor provided with an annular chamber, an annular series of vanes carried by said rotor and circumscribing said annular chamber, a set of admission-ports arranged about the outer periphery of said annular series of vanes, and exhaust-ports positioned between the several admission-ports of said set, said vanes constructed to deflect the actuating medium from the several admission-ports into the circumscribed annular chamber in independent currents, substantially as described.

8. In a turbine, the combination of a rotor, an annular series of vanes carried thereby, and a divergent port for directing an actuating medium against said series of vanes, said port constructed to diverge abruptly by steps, substantially as described.

9. In a turbine, the combination of a rotor, an annular series of vanes carried thereby, and a divergent port for directing an actuating medium against said series of vanes, said port constructed with an entrance portion diverging abruptly by steps and with a curved discharge portion approximately tangent to the direction of the actuating medium flowing therethrough, substantially as described.

10. In a turbine, the combination of a rotor, an annular series of vanes carried thereby, and a divergent port for directing an actuating medium against said series of vanes, said port constructed to diverge abruptly by steps and provided with a rectangular discharge-opening, substantially as described.

11. In a turbine, the combination of a rotor provided with an annular chamber, an annular series of vanes carried by said rotor and circumscribing said annular chamber, a plurality of admission-ports for directing an actuating medium against the outer periphery of said annular series of vanes, controlling means for each of said admission-ports, and a common adjusting means for operating said controlling means, substantially as described.

12. In a turbine, the combination of a rotor provided with an annular chamber, an annular series of vanes carried by said rotor and circumscribing said annular chamber, a plurality of admission-ports for directing an actuating medium against the outer periphery of said annular series of vanes, controlling means for each of said admission-ports, a common adjusting means for operating said controlling means, and governor means for automatically actuating said adjusting means, substantially as described.

13. In a turbine, the combination of a rotor provided with an annular chamber, an annular series of vanes carried by said rotor and circumscribing said annular chamber, a plurality of admission-ports for directing an actuating medium against the outer periphery of said annular series of vanes, valves for controlling the entrance-orifices of each of said admission-ports, and a common adjusting means for operating said valves, substantially as described.

14. In a turbine, the combination of a rotor provided with an annular chamber, an annular series of vanes carried by said rotor and circumscribing said annular chamber, a plurality of admission-ports arranged to direct an actuating medium against the outer periphery of said annular series of vanes, and a brace extending between the several vanes of said annular series and constructed to deflect an actuating medium directed against said vanes by the admission-ports, substantially as described.

15. In a turbine, the combination of a rotor provided with an annular chamber, an annular series of vanes carried by said rotor and circumscribing said annular chamber, a plurality of admission-ports arranged to direct an actuating medium against the outer periphery of said annular series of vanes, and a brace extending medially between the several vanes of said annular series and constructed to divide an actuating medium directed against said vanes by the admission-ports, substantially as described.

16. In a turbine, the combination of a rotor provided with a plurality of annular chambers, a plurality of annular series of vanes carried by said rotor and circumscribing said several annular chambers, a set of admission-ports arranged about the outer periphery of each of said annular series of vanes, the admission-ports of each set being arranged in staggered relation to those of the other sets for producing a uniform torque on the rotor, and exhaust-ports positioned between the several admission-ports of each set, substantially as described.

17. In a turbine, the combination of a rotor provided with a plurality of annular chambers, a plurality of annular series of vanes carried by said rotor and circumscribing said several annular chambers, a set of admission-ports arranged about the outer periphery of each of said annular series of vanes, the admission-ports of each set being arranged in staggered relation to those of the other sets for producing a uniform torque on the rotor, exhaust-ports positioned between the several admission-ports of each set, and independent means for cutting off each set of admission-ports, substantially as described.

In testimony whereof I have signed my name to this specification in the presence of two subscribing witnesses.

RICHARD H. GOLDSBOROUGH.

Witnesses:
FRANK D. BLACKISTONE,
G. AYRES.